United States Patent
Saha et al.

(10) Patent No.: US 8,037,122 B2
(45) Date of Patent: Oct. 11, 2011

(54) PROCESSING OF SERVICE-ORIENTED TASKS WITHIN A GRID COMPUTING ENVIRONMENT

(75) Inventors: Rakesh Saha, Fremont, CA (US); Ashwin Patel, Sunnyvale, CA (US); David Alan Berry, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 12/388,314

(22) Filed: Feb. 18, 2009

(65) Prior Publication Data

US 2010/0077068 A1    Mar. 25, 2010

Related U.S. Application Data

(60) Provisional application No. 61/098,598, filed on Sep. 19, 2008.

(51) Int. Cl.
*G06F 15/16* (2006.01)

(52) U.S. Cl. ........ 709/201; 709/202; 709/205; 709/223; 718/100; 718/101; 718/102; 718/106

(58) Field of Classification Search .................. 709/201, 709/202, 223, 226, 205; 718/100, 101, 102, 718/106
See application file for complete search history.

(56) References Cited

U.S. PATENT DOCUMENTS

| | | | |
|---|---|---|---|
| 7,130,891 B2 * | 10/2006 | Bernardin et al. | 709/218 |
| 7,197,749 B2 * | 3/2007 | Thornton et al. | 718/101 |
| 7,383,550 B2 * | 6/2008 | Challenger et al. | 719/315 |
| 2004/0068729 A1 * | 4/2004 | Simon et al. | 718/102 |
| 2004/0093381 A1 * | 5/2004 | Hodges et al. | 709/204 |
| 2004/0123296 A1 * | 6/2004 | Challenger et al. | 718/102 |
| 2005/0021594 A1 * | 1/2005 | Bernardin et al. | 709/200 |
| 2005/0080930 A1 * | 4/2005 | Joseph | 709/248 |
| 2007/0011291 A1 * | 1/2007 | Mi et al. | 709/223 |
| 2007/0192431 A1 * | 8/2007 | Liu | 709/217 |
| 2008/0209434 A1 * | 8/2008 | Queck et al. | 718/105 |
| 2009/0064151 A1 * | 3/2009 | Agarwal et al. | 718/102 |
| 2009/0193427 A1 * | 7/2009 | Pu et al. | 718/104 |
| 2009/0300154 A1 * | 12/2009 | Branson et al. | 709/223 |
| 2010/0281166 A1 * | 11/2010 | Buyya et al. | 709/226 |

OTHER PUBLICATIONS

Yan Huang. 2003. JISGA: A Jini-Based Service-Oriented Grid Architecture. Int. J. High Perform. Comput. Appl. 17, 3 (Aug. 2003), 317-327.*

Rajkumar Buyya, David Abramson, and Jonathan Giddy. 2001. A Case for Economy Grid Architecture for Service Oriented Grid Computing. In Proceedings of the 10th Heterogeneous Computing Workshop \&\#226;"" HCW 2001 (Workshop 1).*

* cited by examiner

*Primary Examiner* — Dohm Chankong
(74) *Attorney, Agent, or Firm* — Fliesler Myer LLP

(57) ABSTRACT

Embodiments of the present invention enable processing of tasks within a service-oriented architecture (SOA). In embodiments, an echo mediator is a mediator SOA component that acts as a service provider by processing a service request associated with a service requester and returning the result to the service requester. In embodiments, an echo mediator handles a received sequential service request by synchronously processing it. In embodiments, an echo mediator handles a received parallel service request by storing it in a persistent store, and an echo mediator with processing capacity retrieves the stored parallel service request and asynchronously processes it. In embodiments, a group of echo mediators may be distributed among the nodes of a grid, forming an echo mediator grid in which each of the echo mediators interfaces with a common data store deployed within the grid. In embodiments, the grid of echo mediators balances the processing of stored service requests.

19 Claims, 10 Drawing Sheets

PROCESSING OF SERVICE-ORIENTED TASKS WITHIN A GRID COMPUTING ENVIRONMENT

CROSS REFERENCE TO RELATED PATENT APPLICATIONS

This application claims priority under 35 USC §119(e) to U.S. Provisional Application Ser. No. 61/098,598, entitled "Parallel Processing of Service-Oriented Tasks Within a Grid Computing Environment," listing Rakesh Saha and Ashwin Patel as inventors, and filed on Sep. 19, 2008, which application is incorporated herein by reference in its entirety.

BACKGROUND

A. Technical Field

The present invention pertains generally to a grid computing environment, and relates more particularly to parallel processing of service-oriented tasks within a grid computing environment.

B. Background of the Invention

The use of distributed systems for information processing has become commonplace for business enterprises and other organizations, due in part to the rise of the Internet, the World Wide Web, advanced network security, and networking protocols that facilitate network communications. There are many types of distributed systems, ranging from small clusters of identical computing processor nodes occupying one physical location to large global systems that contain many different types of nodes and operating environments.

Developing, deploying, and managing a set of software applications within a distributed system environment become more challenging as the size and complexity of the distributed system environment increases. An approach to meet these challenges is the creation of a grid computing environment ("grid") from a distributed system. A grid typically is created and managed by installing grid middleware, a set of software components and protocols, onto a distributed system platform. A grid provides a virtual single execution platform having a single set of interfaces to common platform services such as application administration, data access, and security, but it also allows exploitation of the parallelism and fault-tolerance that are inherent in the underlying distributed system environment.

In recent years, the predominant structure of enterprise software applications has been adapted to facilitate the performance and management of enterprise information technologies (IT) within distributed system environments. One such adaptation is a service-oriented structure, in which an application is composed of a set of software components that co-operate to execute an application by providing functionality ("services") to each other.

A service-oriented grid environment is a grid that hosts a set of service-oriented applications. It would be advantageous for enterprise IT management if the parallelism and fault-tolerance advantages of the grid environment could be leveraged for a deployed service-oriented application without requiring re-design and/or re-implementation of the application components in order to meet the specific requirements of the grid middleware.

SUMMARY OF THE INVENTION

Embodiments of the present invention enable processing of tasks within a service-oriented architecture (SOA). In embodiments, an echo mediator is a mediator SOA component that acts as a service provider by processing a service request associated with a service requester and returning the result to the service requester. In embodiments, an echo mediator handles a received sequential service request by synchronously processing it. In embodiments, an echo mediator handles a received parallel service request by storing it in a persistent store, and an echo mediator with processing capacity retrieves the stored parallel service request and asynchronously processes it. In embodiments, a group of echo mediators may be distributed among the nodes of a grid, forming an echo mediator grid in which each of the echo mediators interfaces with a common data store deployed within the grid. In embodiments, the grid of echo mediators balances the processing of stored service requests.

In embodiments, a computer program product comprising at least one computer-readable medium storing one or more sequences of instructions that, when executed, cause one or more processors to handle a plurality of service requests within a service-oriented computing grid environment by performing steps that may comprise providing a plurality of service-oriented architecture (SOA) components for distribution within the service-oriented computing grid environment (where each SOA component is of the same type and interfaces with a common persistent store; receiving a first service request (associated with a first service requester) at a first SOA component within the plurality of SOA components; storing the first service request in the common persistent store if the first service request is a parallel service request; and retrieving the stored first service request from the common persistent store by a second SOA component within the plurality of components and then processing the retrieved request and returning the result to the first service requester via a callback. In embodiments, the steps further comprise the first SOA component processing the first service request synchronously and returning a result to the first service requester via a reply if the first service request is a sequential service request.

In embodiments, the first SOA component and the second SOA component are the same SOA component. In embodiments, each of the plurality of SOA components is a mediator. In embodiments, the first service request is an atomic task. In embodiments, the second SOA component retrieves the stored first service request if the second SOA component has capacity to process a service request. In embodiments, handling of the first service request is specified in a service request configuration associated with the first service request. In embodiments, a plurality of service requests are received by the plurality of SOA components and processing of the plurality of service requests is load balanced among the plurality of SOA components.

In embodiments, a computer program product comprising at least one computer-readable medium storing one or more sequences of instructions that, when executed, cause one or more processors to provide a mediator SOA component within a service-oriented computing grid environment by performing steps that may comprise providing an echo mediation SOA component; and, in response to receiving a service request associated with a service requester the echo mediation performing the steps of processing the service request without invoking another service to obtain a result, and returning the result to the service requester. In embodiments, the echo mediation SOA component supports both synchronous and asynchronous service requests. In embodiments, the service request is a synchronous request received from the service requester. In embodiments, the service request is an asynchronous service request received from a persistent store. In embodiments, the computer program product may further comprise a plurality of echo mediator SOA components that are configured to be deployed amount nodes within a grid environment, where each of the plurality of echo mediator SOA components interfaces with the persistent store.

In embodiments, handling a received service request by an echo mediator SOA component may comprise processing the service request without invoking another service to obtain a result and returning the result to the service requester if the service request is a sequential service request; and storing the service request in the persistent store if the service request is a parallel service request. In embodiments, a stored service request associated with a service request is received by an echo mediator SOA component if the echo mediator SOA component has capacity to process a service request. In embodiments, the maximum number of service requests to be processed by an echo mediator SOA component is configurable. In embodiments, the service request is an atomic service request.

In embodiments, a system for handling service requests within a service-oriented computing environment may comprise a SOA component that may comprise a request dispatcher, coupled to receive one or more service requests from one or more requesting SOA components, that identifies a type of a received service request and dispatches the received service request based upon the identified type; at least one asynchronous task dispatcher, coupled to receive a stored service request from a persistent store, where an asynchronous task dispatcher dispatches the stored service request for processing to a task processor within the SOA component; and a task processor, coupled to receive service requests from the request dispatcher and from at least one asynchronous task dispatcher, the task processor processes a received service request to obtain a result and the result is returned to the requesting SOA component associated with the processed service request. In embodiments, service requests received by the request dispatcher are atomic tasks. In embodiments, the request dispatcher dispatches a received service request by dispatching the received service request to the task processor if the received service request is a sequential service request; and dispatching the received service request to the persistent store for storing if the received service request is a parallel service request.

In embodiments, the system may further comprise a plurality of SOA components that are configured to be deployed amount nodes within a grid environment, where each of the plurality of SOA components interfaces with the persistent store. In embodiments, each of the SOA components within the plurality of SOA components is a mediator.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
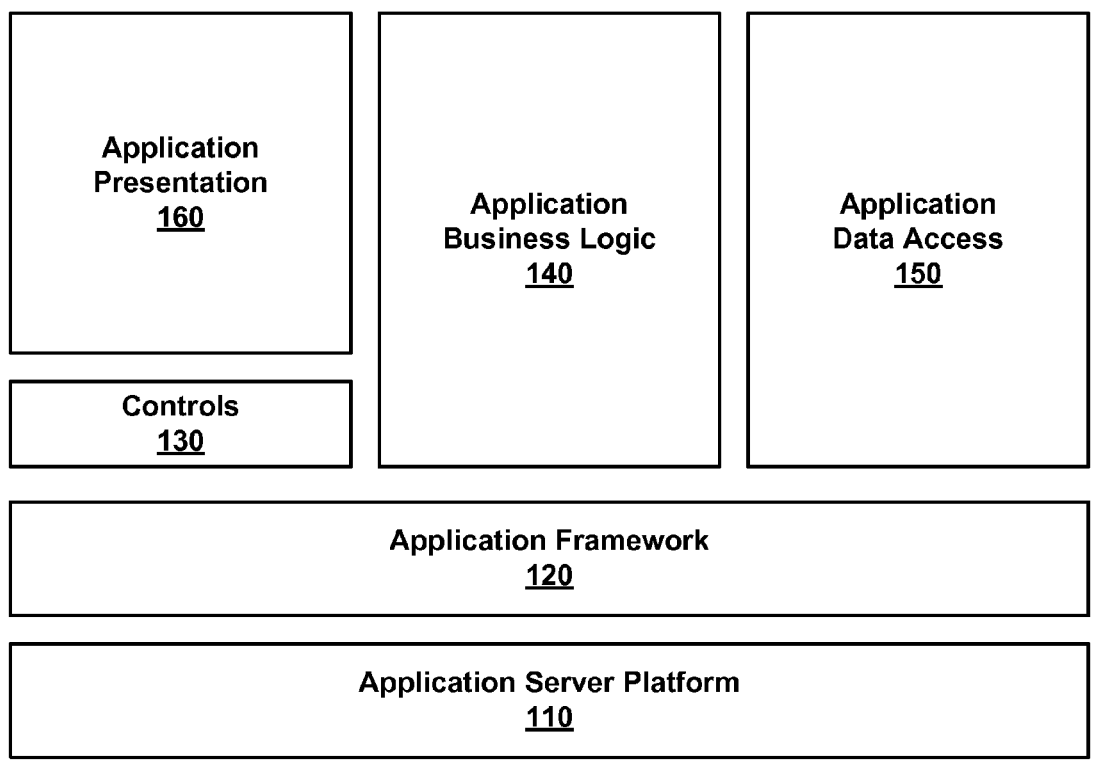
FIG. 1 illustrates an exemplary organization of SOA components into functional layers.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or a combination thereof. Accordingly, the flow charts described below are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

A. Overview

A distributed enterprise software application may be implemented within a system that has a service-oriented architecture (SOA), an application framework that contains a set of loosely coupled software components. Loosely coupled software components have no design interdependencies; the encapsulated functionality of a SOA component is provided to other components as a service that may be consumed as needed. A service consumer component may discover an available service by finding a description of a service producer interface that has been published in a data registry. The service consumer may invoke the available service by sending a service request message to the published interface of a service producer. When a service request message is received, a service producer executes the requested functionality and then may send a result message to the service consumer. A SOA component may be designed to have both service producer and service consumer roles within a SOA framework.

A SOA-based software application is a set of SOA components ("composite") that are associated to perform a higher level task. Rather than being code-based, a modern SOA framework has a data-driven structure in which the association of SOA components is described in a set of text-based configurations that most commonly leverage XML. Deploying an application into a data-driven SOA typically includes supplying a configuration that describes a composite of SOA components as well as a workflow ("choreography") that specifies the order in which the components send and handle messages during application execution.

The functionality of a SOA component (its service) may be used in multiple applications that are hosted on the system. Re-using component functionality minimizes the number and complexity of SOA components that must be maintained. An enterprise SOA may be organized into functional layers of SOA components. The functional layers enable a set of SOA components to supply the application foundation services that are common to applications deployed into the enterprise SOA framework. FIG. 1 illustrates the organization of an exemplary enterprise SOA framework that is deployed onto an application server platform 110. The set of SOA components providing the common application services are deployed into the application framework layer 120 and into the controls 130. In this type of organization, development of a new enterprise application may be simplified because it only requires incremental addition of new application-specific SOA components into the upper layers such as the business logic layer 140, the data access layer 150, and the application presentation layer 160. The composite of SOA components defining the new application thus will be an integration of the newly added components and a set of existing SOA components that includes common services components from the application framework layer 120.

1. SOA Mediation Service

One example of a SOA foundation service is a mediation service. A mediation service facilitates loose coupling among SOA components by preventing a component from referencing any other component directly. Instead of sending a service request directly to a service provider, a component invokes a mediation service with the service request, and the mediation service routes the service request to a service provider component based on a SOA configuration. In addition to message routing, a mediation service also may include message processing tasks such as message validation, transformation, and re-sequencing. Those skilled in the art will recognize that an exemplary implementation of a SOA mediation service is as an Enterprise Service Bus within an application framework 120, but that there are many ways to implement a SOA mediation service. In another example, a mediation service may be implemented by a SOA component type called a mediator.

Figure 2:
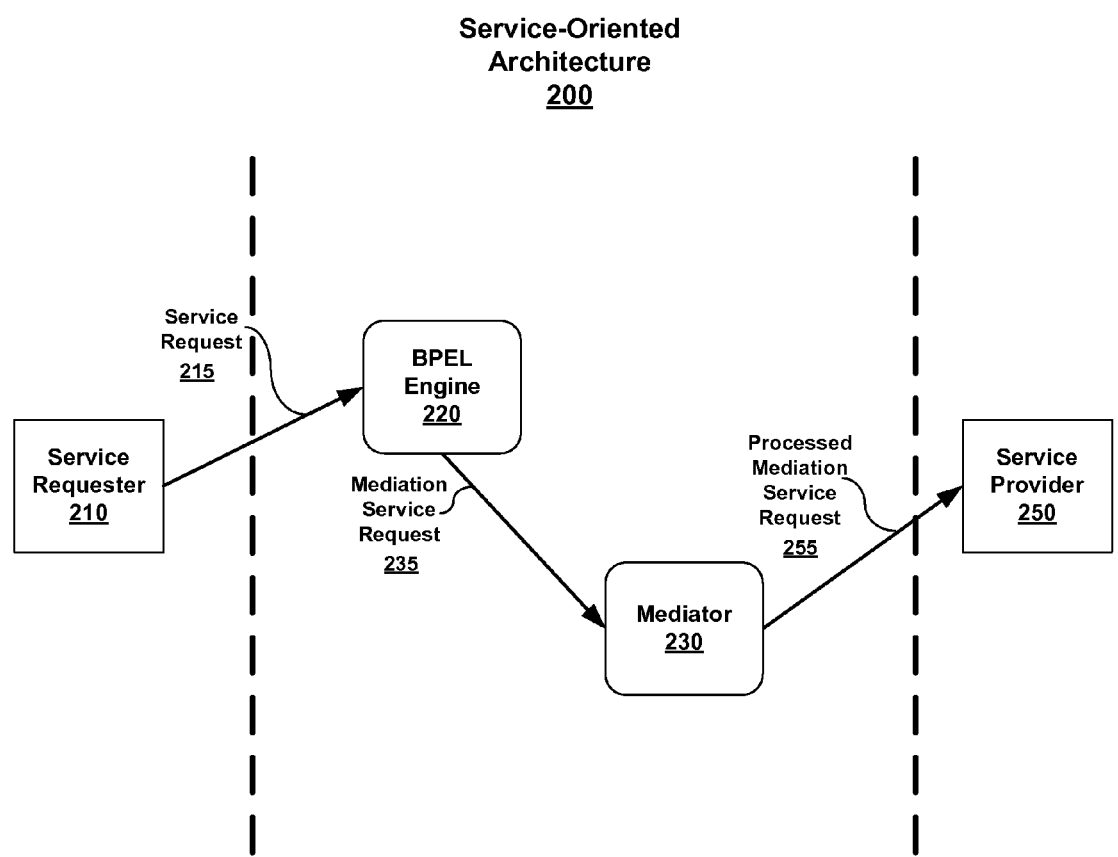
FIG. 2 depicts an exemplary scenario illustrating the role of a mediation service within a SOA according to various embodiments of the invention.

FIG. 2 depicts an exemplary scenario illustrating the role of a mediation service within a SOA 200. In this SOA, the mediation service is provided by a mediator 230 SOA component. A service requester 210 has dispatched a service request 215 to a BPEL engine 220. BPEL (Business Process Execution Language) is a standard language that is used for describing SOA choreography, and a BPEL engine 220 is a type of SOA component that orchestrates the order of interactions among the SOA components within a composite according to a BPEL SOA choreography. As is well known to those skilled in the art, a BPEL engine may receive a service request 215 that specifies a job which the BPEL engine may execute by orchestrating the job into a set of tasks. Some of these tasks may be "atomic" tasks, which are tasks that cannot be further subdivided, and the BPEL engine may send service requests to other SOA components for execution of at least some of the atomic tasks.

In the example, the BPEL engine 220 is requesting a service that is to be provided by a service provider 250. Instead of the BPEL engine 220 sending the service request directly to the service provider 250, the BPEL engine 220 makes a mediation service request 235 to a mediator component 230 within the SOA 200. The mediator component will route a processed service request 255 to the service provider 250.

2. An Echo Mediator

As discussed above, SOA components perform specific functions, which are unique to the SOA component type. Because each SOA component type performs unique services, little overlap of functionality exists between SOA components. However, aspects of mediation services may be beneficially utilized by other SOA components. But, traditionally mediation services are utilized only when routing a service request from a service requestor/service consumer to a service provider. In embodiments of the present invention, aspects of mediation services can be provided to SOA components as a service. That is, at least some of the processing tasks that are associated with mediation services may be invoked by service requests from a requesting SOA component and a result is returned to that requesting SOA component. Examples of these tasks that may be beneficially used by other SOA components include, without limitation, validation, transformation, and re-sequencing.

For example, a mediator can provide transformation services, such as (by way of example and not limitation) XSL/XQuery, to other SOA components that do not have strong transformation support, such as (by way of example and not limitation) Complex Event Processing service engines and Human Workflow service engines. Also, by way of example, a mediator could provide validation services. A mediator could provide syntactic validation services, for example (by way of illustration and not limitation) based on XML Schema Definition (XSD), and/or semantic validation services, based on (by way of example and not limitation) schematron, to other SOA service engines.

Because mediator services traditionally have only been invoked as part of routing between SOA components, no mechanism existed to invoke the mediator component as an end service provider. Thus, in embodiments, a mediator SOA component may be extended according to the teachings of the present patent document to become an end service provider for one or more tasks by processing a request and returning a result to the requestor.

Figure 3:
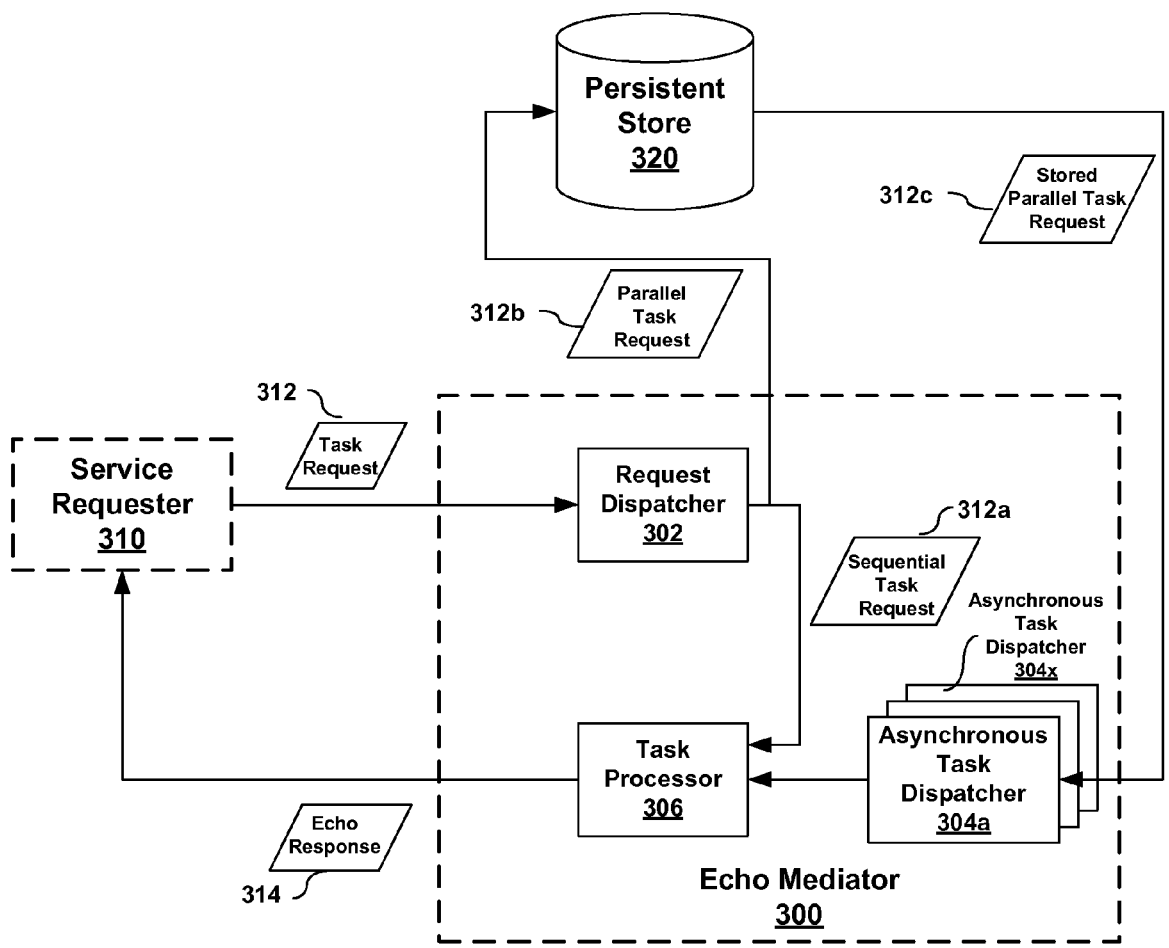
FIG. 3 illustrates an exemplary echo mediator SOA component that receives a service request for an atomic task and returns the processing result to a service requester SOA component according to various embodiments of the invention.

FIG. 3 illustrates an exemplary echo mediator SOA component 300 that receives a service request for an atomic task 312 and returns the processing result 314 to the service requester SOA component 310. In embodiments, an echo mediator 300 may be configured to handle both synchronous and asynchronous service requests 312. As is well known to those skilled in the art, a synchronous service request is received and executed within a processing thread shared by the requester and the receiver. The requester must wait to resume control of the thread until execution of the requested task by the receiver ends. In embodiments of echo mediator 300, a received sequential task request (defined to have sequential routing) 312a that has been identified by a request dispatcher 302 is handled as a synchronous service request and is dispatched to a task processor 306 for execution. Once task processing completes, a task processing result 314 is returned as a reply to the service requester 310.

As is well known to those skilled in the art, an asynchronous service request is executed within a separate thread from the thread in which it is received, so that the requester may resume control of the thread once the task request is dispatched. In various embodiments of echo mediator 300, a received parallel task request (defined to have parallel routing) 312b that has been identified by a request dispatcher 302 is dispatched to a persistent store 320, where the parallel task request 312b is stored. In various embodiments, for example, the persistent store 320 is a database and the task request is an XML document. In embodiments, an asynchronous task dispatcher 304 may pull a stored parallel task request 312c from the persistent store 320 and dispatch the task execution to a task processor 306 for execution. The task processing result 314 is returned to the service requester in a separate thread via a callback function. In various embodiments, an echo mediator 300 instance may be configured to have a set of asynchronous task dispatchers (304a through 304x), enabling the echo mediator instance to perform multi-threaded asynchronous task processing of multiple parallel task requests.

Figure 4:
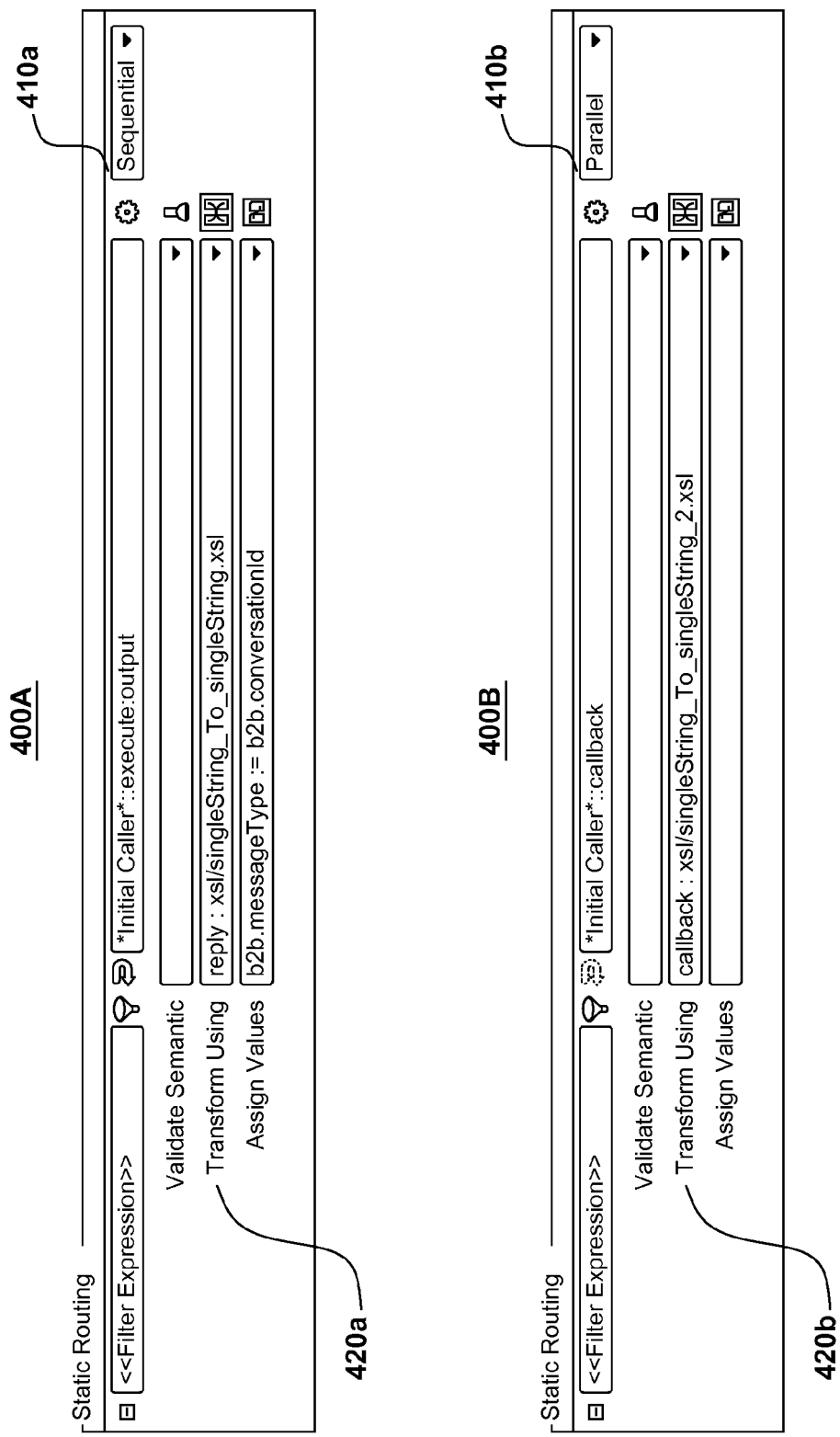
FIG. 4 graphically illustrates examples of echo mediator configurations according to various embodiments of the invention.

In embodiments, an echo mediator 300 that is designed to handle both synchronous and asynchronous service requests may be configured to handle both sequential type requests and parallel type requests. FIG. 4 graphically depicts examples of echo mediator service request configurations. Depicted are a sequential transformation service request 400A and a parallel transformation service request 400B according to various embodiments of the invention. In the examples, the type of service request routing 312 may be specified via a choice from a drop down list ("sequential" 410a or "parallel" 410b), and the type of echo response 314 may be specified via the choice of transformation service request from a drop down list ("reply" 420a or "callback" 420b).

3. Service-Oriented Grid Computing

A distributed computing environment may contain computing resources (e.g., computing nodes, storage, applications, and data) that are spread across different physical locations. A grid computing environment ("grid") virtualizes the distributed computing resources into a single execution environment through the use of grid middleware. An application that executes in a grid computing environment can take advantage of the inherent parallelism and fault-tolerance of the distributed grid resources. A grid computing environment enables a software enterprise to be platform-independent, scalable, reliable, and flexible because it provides a single set of interfaces to widely distributed common application services.

A SOA system may be deployed onto a grid to create a service-oriented grid. A service-oriented grid combines the flexible application design and administration of a SOA with the platform-independent, fault-tolerant high-performance computing of a grid. For example, a computationally expensive SOA service request may be processed in parallel, leveraging the grid environment by distributing the task execution among multiple component instances deployed onto multiple grid computing nodes. However, a service-oriented grid may be more complex and thus more difficult to manage than a SOA that is not deployed onto a grid. For example, a SOA choreography that takes advantage of parallel execution in a service-oriented grid may be more complex because of the additional rules for load balancing and dispatching tasks to specific component instances that are deployed on specific grid computing nodes.

4. An Echo Mediator Component Grid

One specific application of the present invention is its use in embodiments of service-oriented grid environments in which mediation services are implemented by a mediator component type. These embodiments will be described for illustrative purposes and not for limitation. One skilled in the art will recognize that one or more other SOA component types may also be implemented in like manner.

Figure 5:
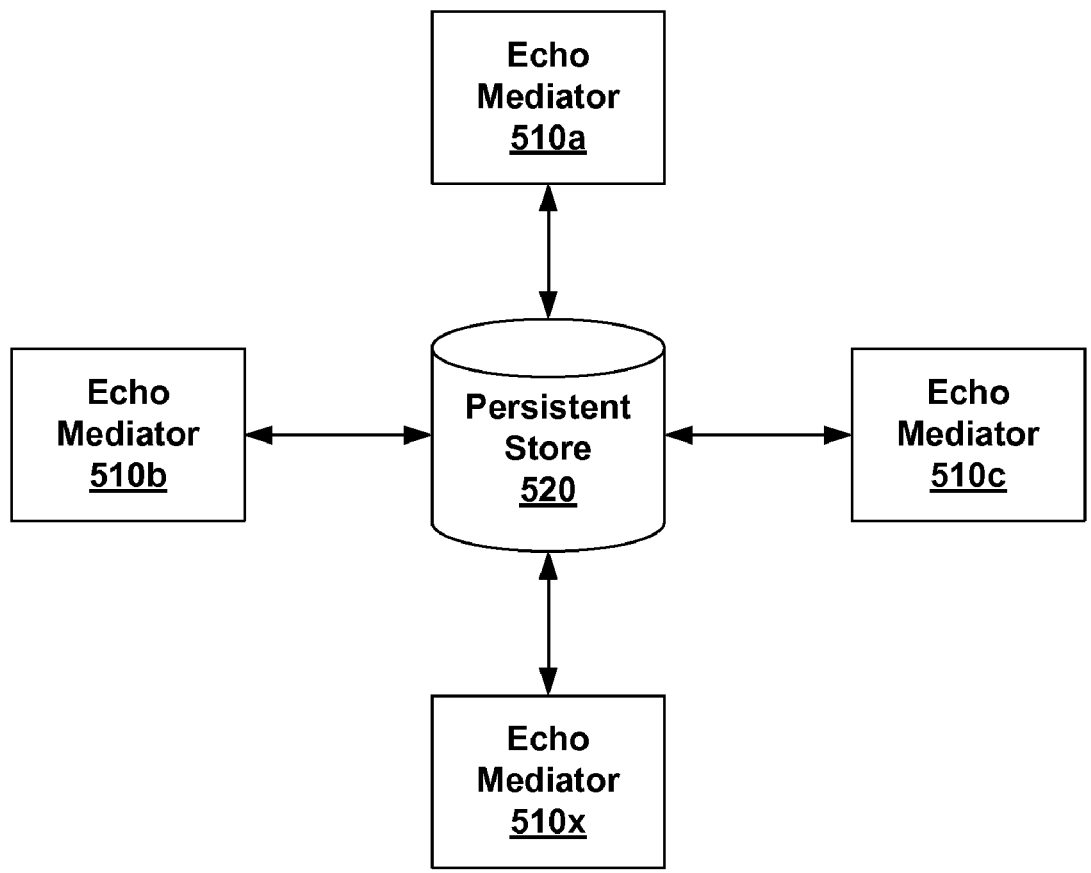
FIG. 5 illustrates an exemplary echo mediator component grid according to various embodiments of the invention.

FIG. 5 illustrates an exemplary echo mediator component grid that comprises a group of echo mediator component instances (510a through 510x) that may be distributed across multiple processing nodes within a service-oriented grid according to various embodiments of the invention. The echo mediator component instances within the echo mediator component grid each interface to a common persistent store 520, such as a database, that also is deployed within the grid. In embodiments, the echo mediator component type functional configuration may be stored as, for example, XML documents in the persistent store 520, and the functional configuration may be downloaded and locally cached by all echo mediator instances within the echo mediator component grid at system startup. FIG. 4 illustrates examples of echo mediator functional configurations for handling transformation service requests according to various embodiments of the invention.

As previously described, a mediation service is a common foundation service that may be invoked by many SOA components. An echo mediator component grid may provide high performance handling of service requests within a SOA because the multiple echo mediator instances within the grid can process multiple service requests in parallel. In embodiments, those service requests may be for atomic tasks that are associated with a mediation service, such as message validation, transformation, and re-sequencing.

Figure 6:
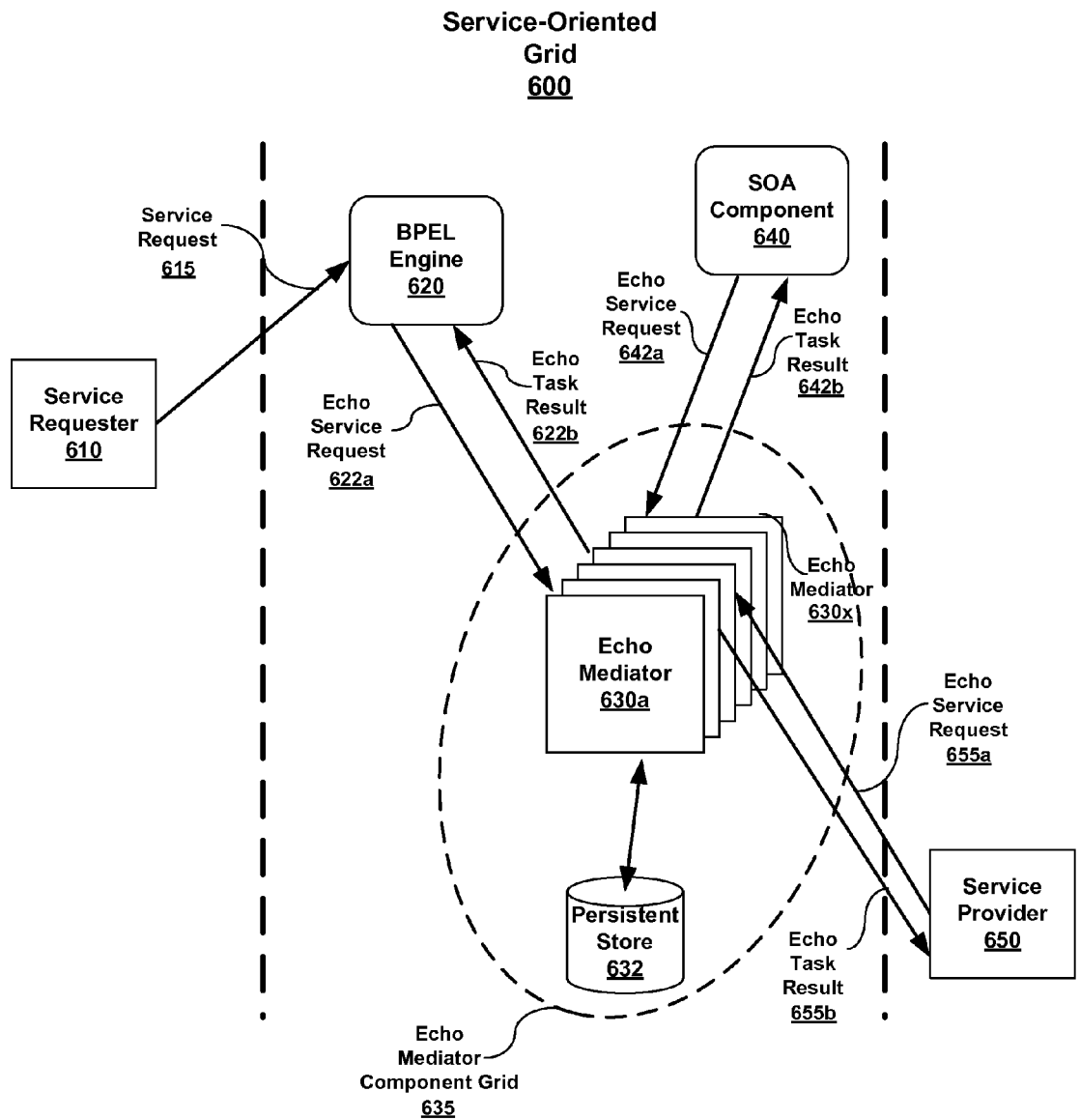
FIG. 6 depicts an exemplary scenario illustrating the role of an echo mediator grid within a service-oriented grid according to various embodiments of the invention.

FIG. 6 depicts an exemplary scenario illustrating the role of an echo mediator grid 635 within a service-oriented grid 600. The echo mediator component grid 635 comprises a plurality of echo mediator component instances (630a through 630x) that are deployed onto various nodes of the service-oriented grid computing environment, and each echo mediator component instance interfaces with a common persistent store 632 that is deployed onto a node within the service-oriented grid 600.

To execute a service request job 615 received from a service requester 610, a BPEL engine 620 may dispatch one or more echo service requests 622a to at least one echo mediator component instance 630 in an echo mediator component grid 635. In embodiments, an echo service request 622a may be designated to have a sequential routing (a sequential task request 312a), and the echo mediator component instance may handle the service request as a synchronous request for which the echo response 314 is returned as a reply echo task result 622b to the BPEL engine 620, as previously described. In embodiments, the echo service request 622a may be designated to have a parallel routing (a parallel task request 312b), and the echo mediator component instance may handle the service request 622a by dispatching it to the persistent store 635 for storage. The stored parallel task request 312c may be retrieved by any of the echo mediator component instances (630a through 630x) comprising the echo component grid 635, and then handled as an asynchronous request for which the echo response 314 is returned as a callback echo task result 622b to the BPEL engine 620, as previously described.

In embodiments, an echo mediator component grid 635 may leverage the resources and structure of the service-oriented grid 600 environment to receive and process multiple echo service requests (e.g., 622a and 642a) from multiple SOA components (e.g., 620 and 640) as well as service requests (e.g. 655a) from third party service providers (650), and then to return corresponding echo service results (e.g. 622a, 622b, and 655b) to the service requesters. In various embodiments, a service request functional configuration, such as 400A and 400B, may include exposure of the service provider interface for the service request as, for example, a SOAP endpoint to enable a third party service provider 650 outside of a service-oriented SOA environment to send a service request 655a to an echo mediator component instance 630 within a service-oriented SOA environment via the Web.

In embodiments, an echo mediator component grid 635 may leverage asynchronous task processing by echo mediator component instances 630 to provide high performance parallel execution of received parallel type service requests. For example, in embodiments, echo mediator component instances distributed across multiple nodes of the service-oriented grid may perform load balancing of parallel service requests dispatched to the grid by using the stored parallel tasks in the shared persistent store 632 as a common task queue. Since an echo mediator instance may be configured to have more than one asynchronous task dispatcher 304, the deployment of the echo mediator component instances comprising an echo mediator component grid 635 may be configured to maximize the available computing resources across the number and type of nodes comprising the service-oriented grid 600.

Those skilled in the art will recognize that, although the present invention is described in terms of an echo mediator component grid, component grids comprising one or more types of other SOA components may be deployed within a service-oriented grid in various embodiments.

B. System Implementations

Figure 7:
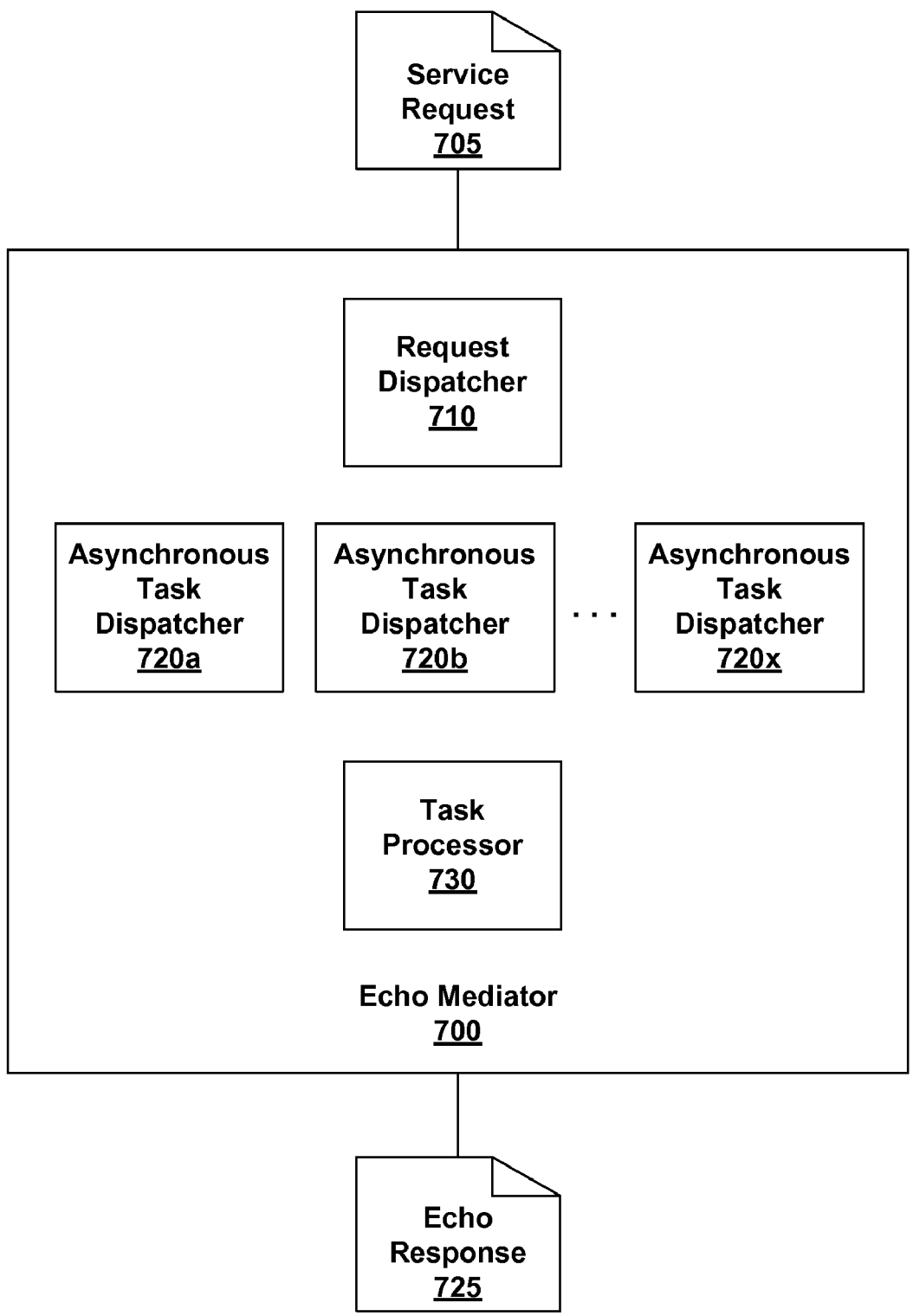
FIG. 7 depicts a block diagram of an echo mediator system according to various embodiments of the invention.

FIG. 7 depicts an echo mediator 700 for handling a service request 705 and returning an echo response 725 according to various embodiments of the invention. Echo mediator 700 comprises a request dispatcher 710, one or more asynchronous task dispatcher instances (720a through 720x), and a task processor 730. Task handling by an exemplary echo mediator component 300 is illustrated in FIG. 3.

In embodiments, request dispatcher 710 receives a service request 705, determines the routing type of the service request 705, and dispatches the service request for handling based on its routing type. As previously described, an echo mediator 700 may be configured to handle both synchronous and asynchronous task requests. In embodiments, a service request 705 may be a sequential task request 312a, which is handled as a synchronous service request and is dispatched to a task processor 730 for execution. The task processing result 314 is returned via a reply as an echo response 725 to the service requester 310 that generated the service request 705.

The service request 705 alternatively may be a parallel task request 312b, which the request dispatcher 710 dispatches to a persistent store 320 for storage. In embodiments, a stored parallel task request 312c is retrieved from the persistent store 320 by an asynchronous task dispatcher 720 and handled as an asynchronous service request, as previously described. The task processing result is returned via a callback as an echo response 725 to the service requester 310 that generated the service request 705. FIG. 4 illustrates exemplary service request configurations for transformation service request routing (410) and handling (420) for an echo mediator 700 according to various embodiments of the invention. As illustrated in FIG. 4, other services, such as validation may also be configured for the task or for a different task. As discussed previously, other services, beside just transformation and validation, may be configured.

In embodiments, an echo mediator 700 may comprise one or more asynchronous task dispatcher 720 instances. Each asynchronous task dispatcher 720 instance may execute in a separate processing thread, enabling an echo mediator 700 to be able to perform multi-threaded asynchronous task processing of multiple parallel task requests. In various embodiments, the number of task dispatcher 720 instances comprising an echo mediator 700 is configurable.

In embodiments, task processor 730 receives a task execution request and generates a task processing result based on the task specified in the task execution request. In embodiments, execution of a task is specified by a task specification plan which may be represented as, for example, an XML document. In embodiments, a set of task specification plans associated with an echo mediator 700 may be provided in a startup configuration (e.g., an XML document) that is loaded into the echo mediator instance at initialization and then cached within the echo mediator instance. In embodiments, the task specification plan to be used in processing a service request 705 may be designated in the service request configuration. Turning to the example illustrated in FIG. 4, the task specification plan designated for service requests 400A and 400B is transformation (420a and 420b). In embodiments, task processor 730 comprises functional libraries upon which task execution is based.

C. Method Implementations

The following sections describe embodiments of methods for handling a service request and returning an echo response within a SOA. The method embodiments may be implemented in embodiments of echo mediator 700.

1. Method for Dispatching a Task Request

Figure 8:
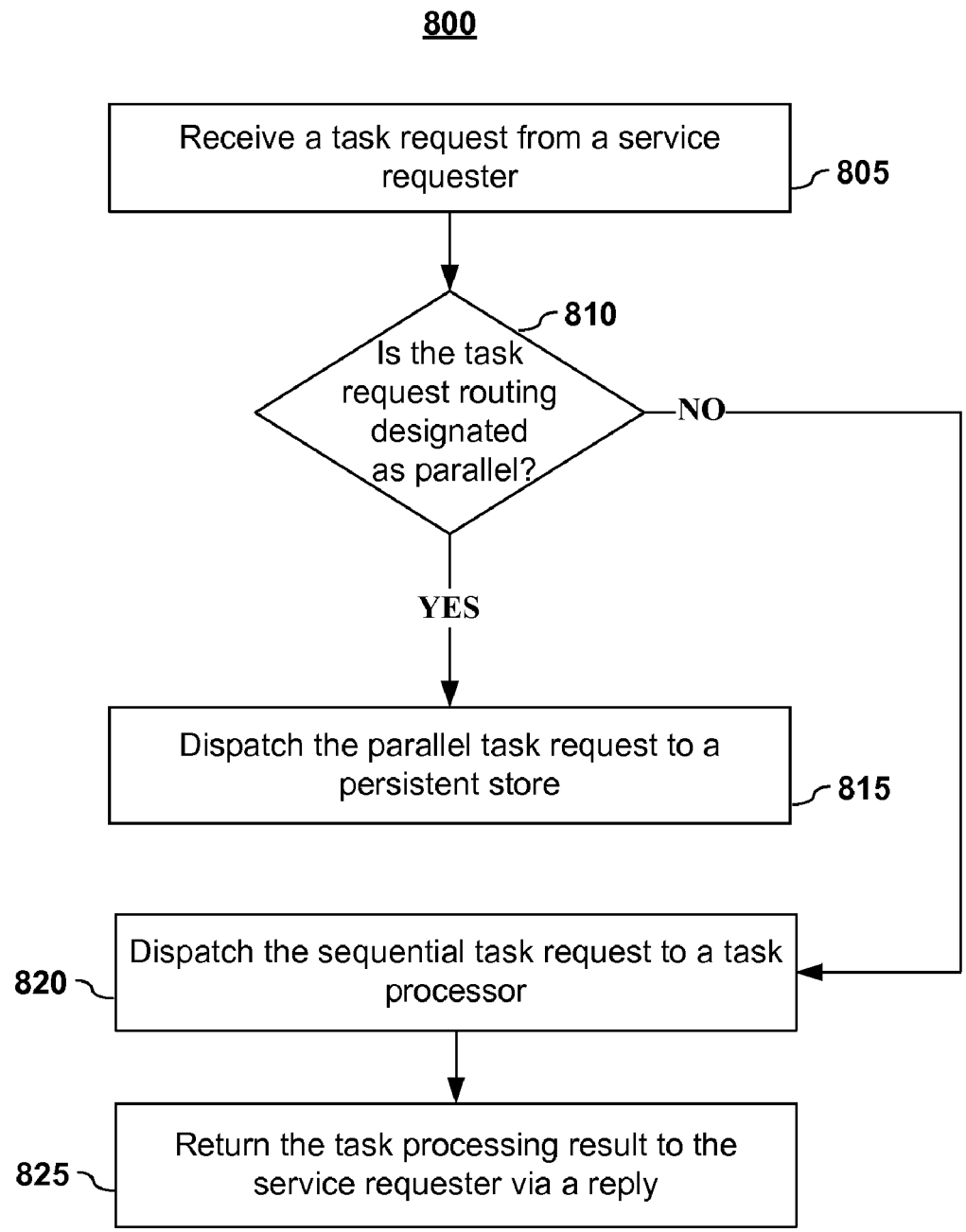
FIG. 8 depicts a method for dispatching a task request according to various embodiments of the invention.

FIG. 8 describes a method 800 for dispatching a task request according to various embodiments of the invention. Method 800 may be implemented in embodiments of request dispatcher 710.

In embodiments, a service request that is received 805 from a service requester may include a routing type. In embodiments, the type of a service request may be specified via a configuration, as illustrated in FIG. 4. As previously described, in various embodiments, a service request routing may be designated to be sequential 410*a* or designated to be parallel 410*b*.

In embodiments, if the service request routing is designated to be sequential 810, the requested task is handled as a synchronous task request, so that task execution occurs in a shared thread with the service requester. The task request is dispatched 820 to a task processor and executed, and the task processing result is returned 825 via a reply to the service requester, which regains control of the thread.

In embodiments, if the service request routing is designated to be parallel 810, the task request is dispatched 815 to a persistent store for storage. In embodiments, a task request may be an XML document, and a persistent store may be a database. Those skilled in the art will recognize that there is a variety of ways to represent a task request and there are many ways to store a task request, and that the choices for task request representation and storage location are not critical to the invention.

2. Method for Asynchronous Task Processing

Figure 9:
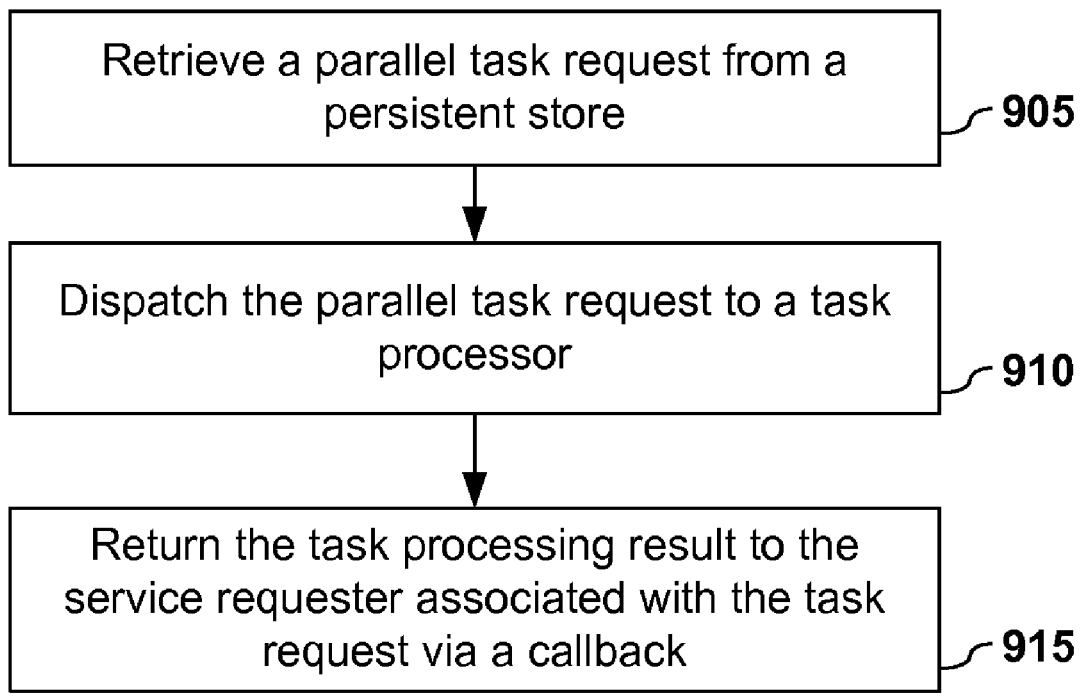
FIG. 9 depicts a method for asynchronous task processing according to various embodiments of the invention.

FIG. 9 depicts a method 900 for asynchronous task processing according to various embodiments of the invention. Method 900 may be implemented by embodiments of asynchronous task dispatcher 720.

Turning again to the exemplary echo mediator task handling scenario illustrated in FIG. 3, a stored parallel task request 312*c* may be retrieved 905 from a persistent store and handled as an asynchronous service request. The task specified in the stored parallel task request 312*c* is dispatched 910 to a task processor and executed within a task execution thread. The task processing result is returned 915 via a callback as an echo response to the service requester that generated the service request.

In various embodiments, multi-threaded asynchronous processing of multiple stored parallel task requests 312*c* may be performed by multiple embodiments of asynchronous task dispatcher (720*a* through 720*x*) implementing method 900.

D. Computing System Implementations

It shall be noted that the present invention may be implemented in any instruction-execution/computing device or system capable of processing data, including without limitation, a general-purpose computer and a specific computer, such as one intended for data processing. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
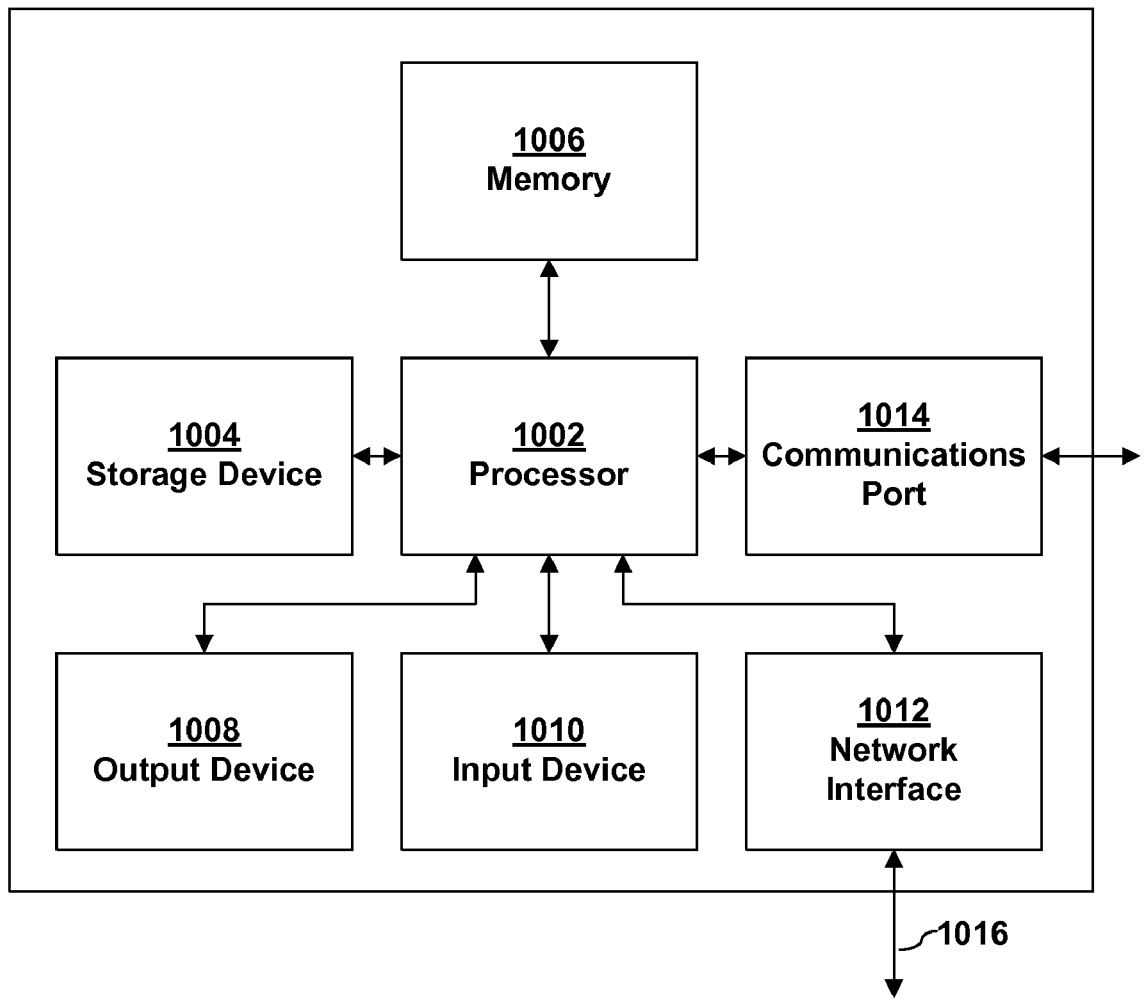
FIG. 10 depicts a block diagram of a computing system according to various embodiments of the invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a magnetic or optical media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1008 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIGS. 3-7 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A computer program product comprising at least one non-transitory computer-readable medium storing one or more sequences of instructions, wherein execution of the one or more sequences of instructions by one or more processors causes the one or more processors to handle a plurality of service requests within a service-oriented computing grid environment by performing the steps comprising:
    providing a plurality of service-oriented architecture (SOA) components, the plurality of SOA components for distribution among processing nodes within the service-oriented computing grid environment, wherein each SOA component of the plurality of SOA components is of the same type and interfaces with a common persistent store;
    receiving a first service request at a first SOA component from the plurality of SOA components, wherein the first service request is associated with a first service requester component;
    responsive to the first service request being a parallel service request, the first SOA component storing the first service request in the common persistent store; and
    retrieving the stored first service request from the common persistent store by the first SOA component within the plurality of SOA components, wherein the first SOA component processes the retrieved first service request asynchronously and returns a result to the first service requester via a callback.

2. The computer program product of claim 1 wherein the steps further comprise:
    responsive to the first service request being a sequential service request, the first SOA component processing the first service request synchronously and returning a result to the first service requester via a reply.

3. The computer program product of claim 1 wherein each of the plurality of SOA components is a mediator.

4. The computer program product of claim 3 wherein the first service request is an atomic task.

5. The computer program product of claim 2 wherein a plurality of service requests are received by the plurality of SOA components and processing of the plurality of service requests is load balanced among the plurality of SOA components.

6. The computer program product of claim 5 wherein a second SOA component within the plurality of SOA components retrieves the stored first service request responsive to having capacity to process a service request.

7. The computer program product of claim 2 wherein handling of the first service request is specified in a service request configuration associated with the first service request.

8. A computer program product comprising at least one non-transitory computer-readable medium storing one or more sequences of instructions, wherein execution of the one or more sequences of instructions by one or more processors causes the one or more processors to provide a mediator service-oriented architecture (SOA) component within a service-oriented computing environment by performing the steps comprising:
    providing an echo mediator SOA component, wherein the echo mediator SOA component supports both synchronous and asynchronous service requests;
    receiving a service request associated from the service requester by the echo mediator SOA component;
    responsive to the service request being a sequential service request, allowing the echo mediator SOA component to perform the steps of:
        processing the service request without invoking another service to obtain the result, and
        returning the result to the service requester; and
    responsive to the service request being a parallel service request, allowing the echo mediator SOA component to perform the steps of storing the service request in a persistent store.

9. The computer program product of claim 8 wherein the service request associated with the service requester is a synchronous service request received from the service requester.

10. The computer program product of claim 8 wherein the service request associated with the service requester is an asynchronous service request received from the persistent store.

11. The computer program product of claim 8 wherein the steps further comprise:
    responsive to the echo mediator SOA component having capacity to process a service request, receiving from the persistent store a stored service request associated with a service requester.

12. The computer program product of claim 11 further comprising a plurality of echo mediator SOA components that are configured to be deployed among nodes within a grid environment and wherein each echo mediator SOA component interfaces with the persistent store.

13. The computer program product of claim 11 wherein a plurality of service requests are stored in the persistent store, and wherein the echo mediator SOA component performs multi-threaded processing by retrieving at least some of the plurality of service requests.

14. The computer program product of claim 13 wherein a maximum number of service requests from the plurality of service requests to be processed by the echo mediator SOA component is configurable.

15. The computer program product of claim 8 wherein the service request is an atomic service request.

16. A system for handling service requests within a service-oriented computing environment, the system comprising:
one or more microprocessors;
a service-oriented architecture (SOA) component running on the one or more microprocessors comprising:
a request dispatcher, coupled to receive one or more service requests from one or more requesting SOA components, wherein the request dispatcher determines whether a received service request is a sequential service request or a parallel service request, and the request dispatcher operates to
responsive to the received service request being a sequential service request, dispatch the received service request to the task processor within the SOA component for processing; and
responsive to the received service request being a parallel service request, dispatch the received service request to a persistent store for storing;
at least one asynchronous task dispatcher, coupled to receive a stored service request from the persistent store, wherein the at least one asynchronous task dispatcher dispatches the stored service request for processing to a task processor within the SOA component; and
the task processor, coupled to receive service requests from the request dispatcher and from the at least one asynchronous task dispatcher, wherein a service request received and processed by the task processor to obtain a result and the result is returned to a requesting SOA component associated with the processed service request.

17. The system of claim 16 wherein service requests received by the request dispatcher are atomic tasks.

18. The system of claim 16 further comprising a plurality of SOA components that are deployed among nodes within a grid environment and wherein each SOA component is configured to interface with the persistent store.

19. The system of claim 18 wherein each of SOA components of the plurality of SOA components is a mediator.

* * * * *

UNITED STATES PATENT AND TRADEMARK OFFICE
CERTIFICATE OF CORRECTION

| | | |
|---|---|---|
| PATENT NO. | : 8,037,122 B2 | Page 1 of 1 |
| APPLICATION NO. | : 12/388314 | |
| DATED | : October 11, 2011 | |
| INVENTOR(S) | : Saha et al. | |

It is certified that error appears in the above-identified patent and that said Letters Patent is hereby corrected as shown below:

On the Title Page, Item (74), under "Attorney, Agent, or Firm", line 1, delete "Fliesler Myer LLP" and insert -- Fliesler Meyer LLP --, therefor.

In column 5, line 33, delete "modem" and insert -- modern --, therefor.

Signed and Sealed this
Twenty-seventh Day of December, 2011

David J. Kappos
*Director of the United States Patent and Trademark Office*